C. A. DEPUY AND C. C. OLIVER.
SAFETY STEERING DEVICE FOR AUTOMOBILES.
APPLICATION FILED AUG. 23, 1918.

1,334,082.

Patented Mar. 16, 1920.

INVENTORS:
Charles A. Depuy
Chester C. Oliver
by Macleod, Calver, Copeland & Dike
ATTYS.

UNITED STATES PATENT OFFICE.

CHARLES A. DEPUY AND CHESTER C. OLIVER, OF NEWTON, MASSACHUSETTS.

SAFETY STEERING DEVICE FOR AUTOMOBILES.

1,334,082.   Specification of Letters Patent.   Patented Mar. 16, 1920.

Application filed August 23, 1918. Serial No. 251,098.

*To all whom it may concern:*

Be it known that we, CHARLES A. DEPUY and CHESTER C. OLIVER, both citizens of the United States, residing at Newton, in the county of Middlesex, State of Massachusetts, have invented a certain new and useful Improvement in Safety Steering Devices for Automobiles, of which the following is a specification, reference being had therein to the accompanying drawings.

Our invention relates to steering devices for automobiles and the object is to provide an attachment which under normal conditions automatically guides the vehicle in a straight course even though the hands of the driver maintain only a light grip or are entirely removed from the steering wheel, and which if either one of the steering wheels strikes a small obstruction such as a stone in the road-way so that they are momentarily turned out of a straight course, will as soon as the obstruction is passed automatically return the front wheels to the normal position.

The invention will be fully understood from the following description when taken in connection with the accompanying drawings and the novel features thereof will be pointed out and clearly defined in the claims at the close of this specification.

Figure 1:
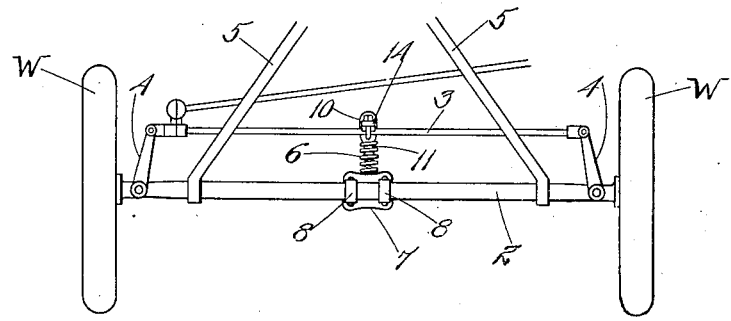

In the drawings, Figure 1 is a plan view of the front part of the running gear of an automobile having attached thereto the device embodying the invention.

Figure 2:
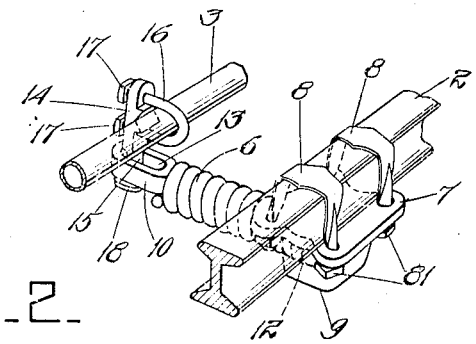

Fig. 2 is a detail view on a larger scale than Fig. 1, showing a portion of the steering rod and front axle with the device embodying the invention connected therewith.

Referring now to the drawings, W W represent the front wheels of an automobile, 2 the axle and 3 the steering rod connected in well known manner to the axle 2 by the knuckle arms 4. The axle 2 may be connected with the radius rods 5, 5 extending to the fly wheel casing not shown.

Extending between the axle 2 and the steering rod 3 at right angles thereto is a rather stiff coil spring 6 which is rigidly connected with the axle 2 and is loosely connected with the steering rod 3 by a connecting rod in a manner to give the spring a sort of a pendulum motion which will be hereinafter described.

One form of connection of the spring 6 with the axle 2 is that shown in the drawings and is as follows: A base plate 7 is rigidly clamped to the under side of the axle 2 by a pair of yokes or clevises 8, 8 which loop over the upper side of the axle and extend down through the base plate, the lower end of the said clevises being screw threaded and provided with nuts 81 which are set up so as to draw down the clevises to firmly bind the base plate to the axle. Lock washers are preferably provided to prevent the nuts from loosening.

On the under side of the base plate 7 there is a socket member 9 preferably made integral with the base plate and having a socket opening 12 which faces toward the end of the spring 6 and within which said spring 6 is firmly and rigidly held.

A plug 10 is formed with a shank 11 which is inserted in the rear end of the coil spring 6, being preferably rigidly held therein in such manner as to prevent rotation on its axis within the coil spring, and to prevent the plug from being withdrawn. The particular method of connection is immaterial so long as the connection is rigid so as to prevent movement of the plug longitudinally or tipping at an angle to the axis of the spring. The plug 10 is formed with a slot 13 which extends vertically through the plug and is elongated in the lengthwise direction of the plug. The lower end portion 15 of a short vertical connecting rod 14 extends down through said elongated slot 13, and fits loosely therein, the portion 15 which extends through said slot being circular in cross section so that it can easily rotate on its axis within said slot and also move bodily lengthwise of the slot. The lower end of the rod 14 is provided with a head 18 to prevent the rod from withdrawing from the slot.

The said rod 14 is rigidly secured to the steering rod 3 by a yoke or clevis 16, the two arms of which are in a vertical plane and pass through holes in the rod 14, the clevis being clamped against the steering rod by clamp nuts 17, 17 which are screwed onto the threaded ends of the clevis 16. Preferably lock washers are provided to prevent the clamp nuts from loosening. This connection allows the steering rod to swivel in a horizontal plane, the rod 14 serving as a pivot within the slot 13.

The longitudinal slot 13 allows the steering rod 3 and the pivot connecting rod 14 to move from their normal positions toward the front axle as required.

In operation, whenever the steering rod 3 is moved in either direction to turn the front wheels, it will bring one end of the steering rod 3 nearer to the axle 2. The rod 14 being rigidly clamped to the steering rod 3, said rod 14 will turn slightly on its axis in the slot 13 through an arc corresponding to the angle that the rod 3 moves out of parallel relation to the axle 2. Whenever the steering rod is moved in either direction out of normal, the front wheels will veer out of a straight course, and the spring 6 will yield under tension to allow such movement, but as soon as permitted the tendency of the spring to resume its normal position will pull back the steering rod, and thereby the wheels into normal position.

What we claim is:

A safety attachment for steering mechanism for automobiles comprising a spring, means for clamping one end of said spring to the front axle of an automobile, a member rigidly secured to the other end of said spring having a slot which is elongated in the direction of the axis of the spring, a connecting rod which has a loose connection with said slot, and means for clamping the said connecting rod rigidly to the steering rod of the automobile, the said slotted member and spring being oscillatable with relation to said connecting rod, and said connecting rod being movable bodily in the lineal direction of the slot.

In testimony whereof we affix our signatures.

CHARLES A. DEPUY.
CHESTER C. OLIVER.